(12) United States Patent
Pelz et al.

(10) Patent No.: US 12,102,251 B2
(45) Date of Patent: Oct. 1, 2024

(54) PET BED

(71) Applicants: Stanley Pelz, Lake Mary, FL (US); Jennifer Mallard Pelz, Lake Mary, FL (US)

(72) Inventors: Stanley Pelz, Lake Mary, FL (US); Jennifer Mallard Pelz, Lake Mary, FL (US)

( * ) Notice: Subject to any disclaimer, the term of this patent is extended or adjusted under 35 U.S.C. 154(b) by 83 days.

(21) Appl. No.: 17/934,882

(22) Filed: Sep. 23, 2022

(65) Prior Publication Data

US 2023/0029976 A1 Feb. 2, 2023

Related U.S. Application Data

(63) Continuation of application No. 15/482,788, filed on Apr. 9, 2017, now abandoned, which is a continuation-in-part of application No. 13/149,879, filed on May 31, 2011, now abandoned, and a continuation-in-part of application No. 29/571,710, filed on Jul. 21, 2016, now Pat. No. Des. 822,910.

(Continued)

(51) Int. Cl.
| | | |
|---|---|---|
| *A01K 1/035* | (2006.01) | |
| *A01K 1/015* | (2006.01) | |
| *A45C 9/00* | (2006.01) | |
| *A45F 3/04* | (2006.01) | |
| *A45F 4/02* | (2006.01) | |
| *A45F 4/06* | (2006.01) | |
| *A47C 7/02* | (2006.01) | |
| *A47C 31/11* | (2006.01) | |
| *A47G 9/02* | (2006.01) | |
| *A47G 9/10* | (2006.01) | |

(52) U.S. Cl.
CPC .......... *A47G 9/1045* (2013.01); *A01K 1/0157* (2013.01); *A01K 1/0353* (2013.01); *A45C 9/00* (2013.01); *A45F 3/04* (2013.01); *A45F 4/02* (2013.01); *A45F 4/06* (2013.01); *A47C 7/021* (2013.01); *A47C 31/11* (2013.01); *A47G 9/0223* (2013.01); *A45C 2009/002* (2013.01); *A45C 2009/007* (2013.01); *A45F 2004/026* (2013.01)

(58) Field of Classification Search
CPC ....... A01K 1/0157; A01K 1/0353; A45F 4/02; A47C 20/00; A47G 9/00
See application file for complete search history.

(56) References Cited

U.S. PATENT DOCUMENTS 4,008,688 A * 2/1977 Nicholas ................. A01K 29/00
119/1
4,723,300 A * 2/1988 Aranow .................. A45C 9/00
383/4

(Continued)

*Primary Examiner* — Monica L Perry
*Assistant Examiner* — Henry Hooper Mudd
(74) *Attorney, Agent, or Firm* — Christopher M. Ramsey; GrayRobinson, P.A.

(57) ABSTRACT

The invention relates to a pet bed configurable as any of a plurality of cushion types or a blanket. The pet bed may be folded a first way and secured in place with a first attachment device to form a cushion with a first surface type. The pet bed may be folded a second way and secured with a second and third attachment device to form a cushion with a second surface type. The pet bed may be unfolded to form a blanket. Additionally, the pet bed is constructed of fully washable materials so that the pet bed may be washed in a typical household washing machine.

5 Claims, 24 Drawing Sheets

Related U.S. Application Data

(60) Provisional application No. 61/349,818, filed on May 29, 2010.

(56) References Cited

U.S. PATENT DOCUMENTS

| | | | | |
|---|---|---|---|---|
| 4,991,245 A | * | 2/1991 | Franco | A47G 9/06 |
| | | | | 5/419 |
| 5,730,529 A | * | 3/1998 | Fritz | B65D 30/10 |
| | | | | 383/4 |
| 2023/0096184 A1 | * | 3/2023 | Ogedengbe | A47G 9/0261 |

* cited by examiner

PET BED

CROSS REFERENCE TO RELATED APPLICATIONS

This is a continuation of application Ser. No. 15/482,788, filed 9 Apr. 2017, which is a continuation-in-part of application Ser. No. 13/149,879, filed 31 May 2011, which claims priority to provisional application 61/349,818, filed 29 May 2010 and is further a continuation-in-part of application Ser. No. 29/571,710, filed 21 Jul. 2016, of which the entire contents of all such references are hereby incorporated herein by this reference for all that they disclose for all purposes.

TECHNICAL FIELD OF THE INVENTION

The present invention relates the novel ornamental and utilitarian features of a pet bed that can be securely folded to make a pet bed and unfolded to make a blanket and to allow washing.

BACKGROUND OF THE INVENTION

There are many multipurpose fold-up blankets, and similar devices are known and are typically used by people during outdoor activities such as picnics, beach trips, and camping trips. While many such devices work for their intended purpose, they have their issues. One major drawback of such devices is that they are not easily cleaned, and their uses are limited. One use of a fold-up blanket is for a pet bed. Many different configurations of pet bed devices are known; however, such prior art devices are constructed in a manner that does not provide for completely laundering the entire device in a household washer and dryer. Some prior art devices have removable covers that may be advertised as washable, but the inside of such devices is not easily cleaned, and portions of such multi-piece devices may become separated and lost. Other prior art pet beds are simply constructed of hypo-allergenic material and/or odor-resistant materials such as wood chips, while others use water-resistant beds and are cleaned by squirting them with water from a water hose. Such prior art pet beds are not easily thoroughly cleaned, particularly the inside portions, and as a result, the inside becomes smelly and increasingly unsanitary over time.

Another problem with such prior art pet bed devices relates to reassembly after cleaning. Putting the pet bed cover back on a pet bed (the ones with removable covers) is often cumbersome and awkward and is similar to putting a pillow case cover on a pillow that is too large.

Regarding fold-up blankets used by humans, the utility of such devices is typically limited to a few functions. While such devices work well for their intended purposes, their utilitarian value is limited.

SUMMARY OF THE INVENTION

Some of the objects and advantages of the invention will now be set forth in the following description, while other objects and advantages of the invention may be obvious from the description or may be learned through practice of the invention.

Broadly speaking, a principle object of the present invention is to provide a foldable pet bed that can be configured as a cushion and a blanket that is easily laundered. The pet bed may have a first foldable portion composed of a first material wherein the perimeter defines a rectangle when unfolded, having a first surface, an opposing second surface, a pet bed width, and pet bed length for the first foldable portion. A second foldable portion composed of a second material may have a perimeter that also defines a rectangle about half the size (e.g., half the width) of the first foldable portion. The second foldable portion has a first surface, an opposing second surface, a pet bed width half the width of the first foldable portion, and a pet bed length equal to the first foldable portion length. The first surface of the second foldable portion is attached to the first surface of the first foldable portion so that the perimeters are aligned, and the second foldable portion covers about half of the first foldable portion. An attachment device (e.g., zipper) may be associated with the perimeter of the second foldable portion so that a cushion defining a first outer surface is formed when the first foldable portion and the second foldable portion are folded and secured in place with the attachment device. Alternatively, a blanket is formed when said first foldable portion and second foldable portion are unfolded.

A second object of the present invention is to provide a foldable pet bed that can be folded a first way and secured to form a cushion with a first surface type, folded a second way and secured to form a cushion with a second surface type, and unfolded to define a blanket that is easily laundered. The foldable pet bed may comprise a first foldable portion composed of a first material wherein the perimeter defines a rectangle when unfolded. The first foldable portion may have a first surface, an opposing second surface, a first foldable portion width, and a first foldable portion length. The pet bed further comprises a second foldable portion composed of a second material with a perimeter defining a rectangle when unfolded. The second foldable portion may have a first surface, an opposing second surface, a second surface width half the width of the first foldable portion width, and a second surface length equal to the first foldable portion length. The second foldable portion's first surface is attached to the first foldable portion's first surface so that their perimeters are in alignment, and the second foldable portion's first surface covers half of the first foldable portion's first surface. A first attachment device (e.g., zipper) is associated with the perimeter of the second foldable portion, and a second attachment device is associated with one end of the first foldable portion's second surface. A third attachment device is associated with the first foldable portion's second surface end that opposes the end where the second attachment device is located. The pet bed may be folded one way and secured in place by the first attachment device to form a first cushion having a first surface type. The pet bed may be folded a second way so that the second attachment device is associated with the third attachment device, thereby securing the pet bed in a second cushion configuration having a second surface type. The pet bed may also be unfolded into a blanket.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
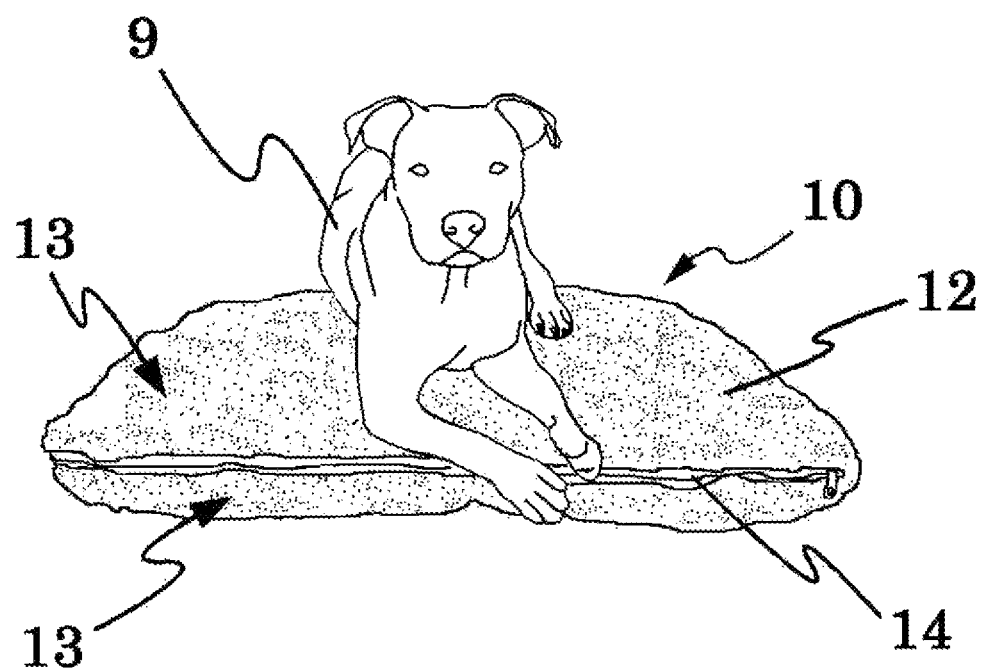
FIG. 1 is a front perspective view of one exemplary embodiment of a convertible cushion being used as a pet bed.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended to limit the broader aspects of the present invention.

Construction Aids

For the purposes of this document, two or more items are "mechanically associated" by bringing them together or into a relationship with each other in any number of ways, including direct or indirect physical "releasable connections" (snaps, screws, Velcro®, bolts, etc.—generally connections designed to be easily and frequently released and reconnected without the need of a tool), "hard-connections" (welds, rivets, macular bonds, generally connections that one does not anticipate disconnecting very often if at all and that generally needs to be "broken" to separate perhaps using a tool), and/or "moveable connections" (rotating, pivoting, oscillating, etc.).

Unless otherwise stated, integral means to be part of the whole and must be "broken" to be separated from the whole.

For the purposes of this document, unless otherwise stated, the phrase "at least one of A, B, and C" means there is at least one of A, or at least one of B, or at least one of C or any combination thereof (not one of A, and one of B, and one of C).

This document includes headers that are used for place markers only. Such headers are not meant to affect the construction of this document, do not in any way relate to the meaning of this document, nor should such headers be used for such purposes.

While the particulars of the present invention and associated technology may be described for use with dogs, the invention may be adapted for use with any type of animal or pet.

DETAILED DESCRIPTION

FIG. 1 presents a top perspective view of one exemplary embodiment of a convertible cushion (10) being used by a pet (9) as a bed/cushion. Similarly, FIG. 2 shows the same configuration, not in use. For such an exemplary configuration, the convertible cushion (10) is folded and fully secured by an attachment device (14), a zipper. Any suitable attachment device (14) may be used without departing from the scope of the invention, including zippers, magnets, hook and loop, buttons, and snaps. In FIG. 1, the convertible cushion (10) is folded and zipped, defining a multiple-layered pillow-like bed. Such an attachment device makes a mechanical connection that is, by definition, in this document, a connection that does not require a tool to separate.

Figure 2A:
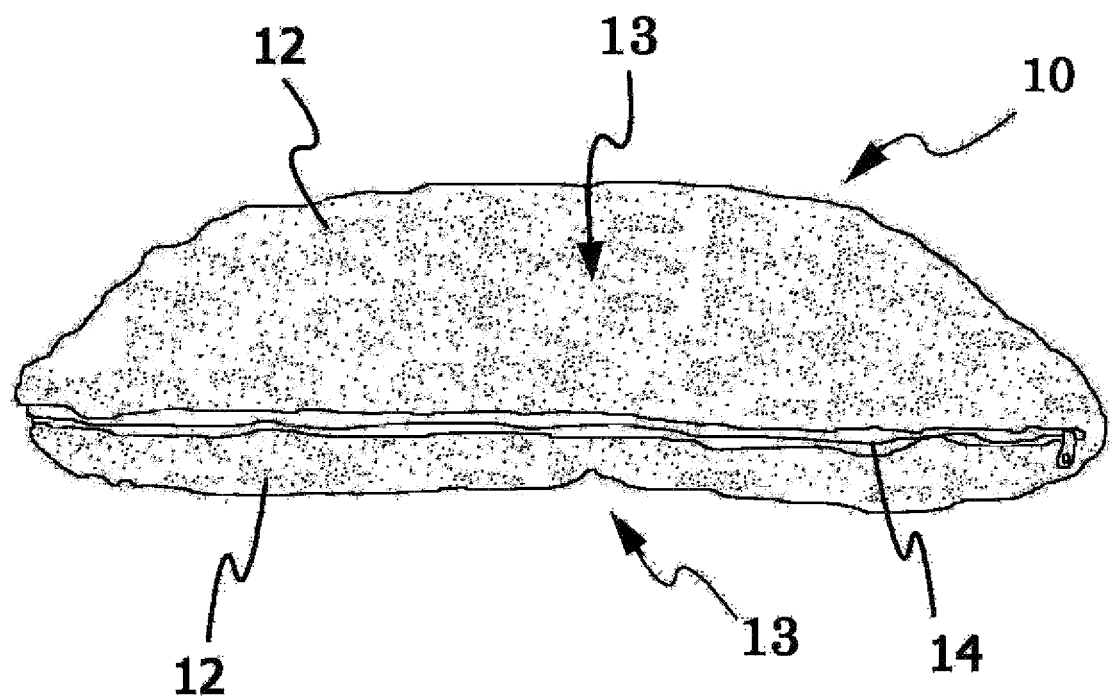
FIG. 2a is the view of FIG. 1 without the pet.
Figure 2B:
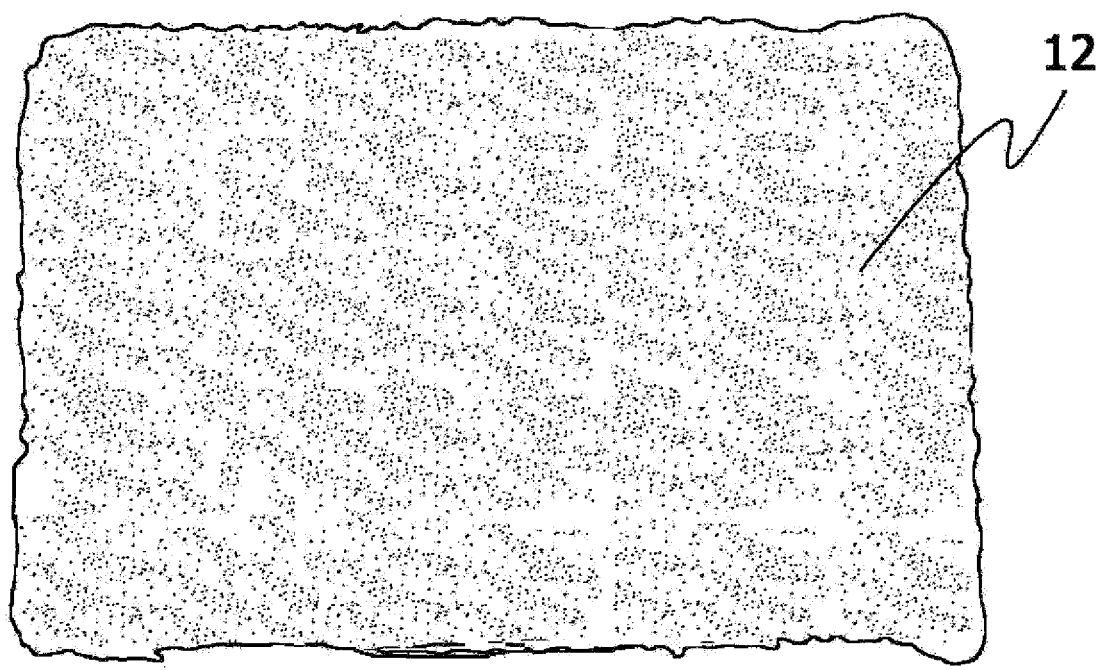
FIG. 2b is a top plan view of the convertible cushion of FIG. 1.
Figure 2C:
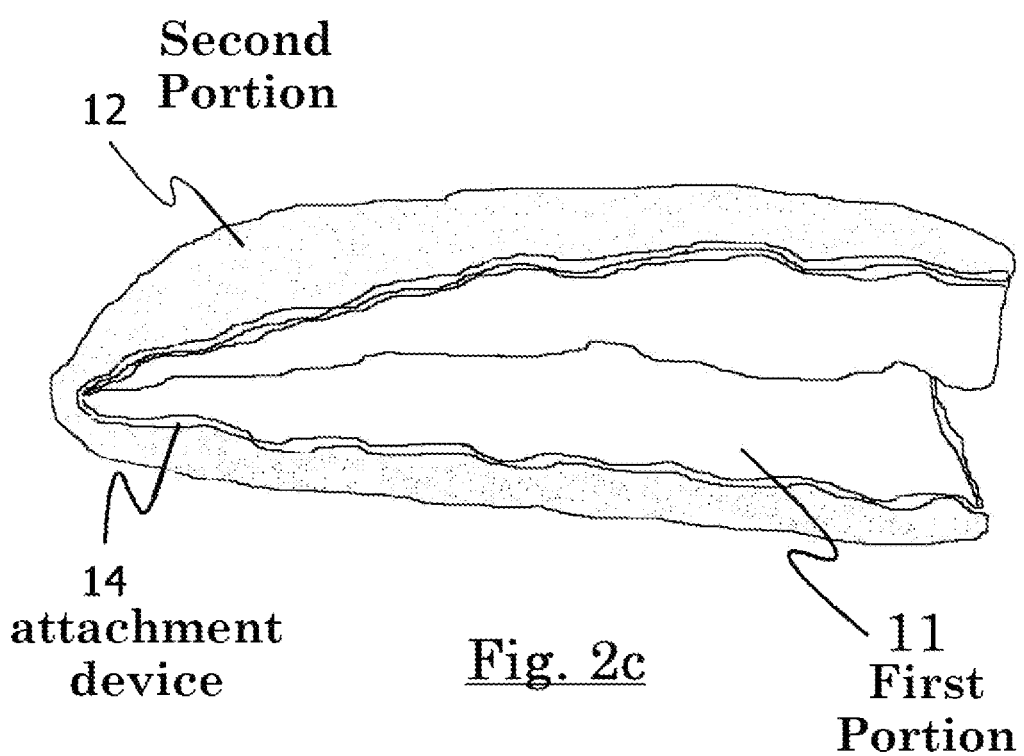
FIG. 2c is a side view of the convertible cushion of FIG. 2b partially zipped.
Figure 2D:
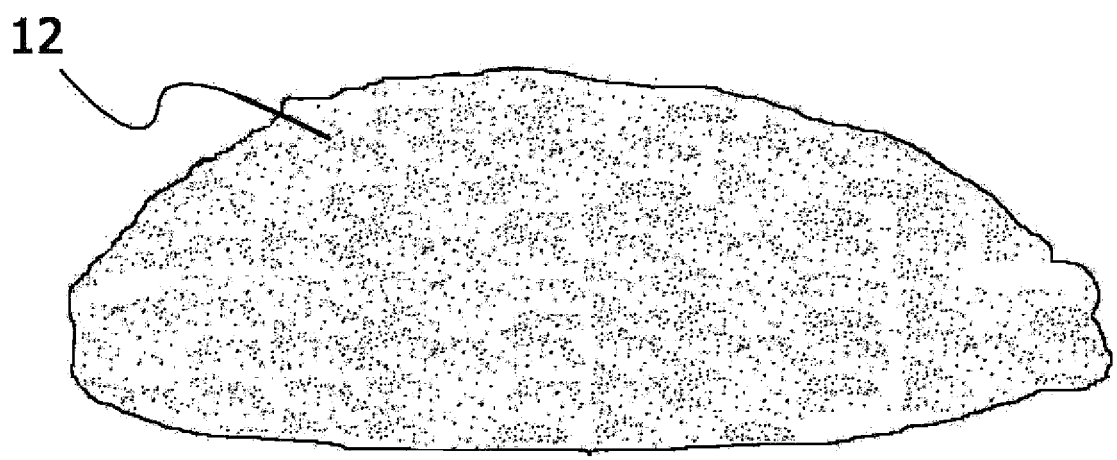
FIG. 2d is a backside view of the convertible cushion of FIG. 1.

Referring now to FIGS. 2a, 2b, 2c, and 2d, for the zipped configuration of FIG. 1, as best seen in FIG. 2c presenting a partially unzipped convertible cushion, the first portion (11) defines at least part of the inner folds while an outer surface of the second portion (12) (described in more detail below) defines at least part of the exterior surface (13) of convertible cushion (10). FIG. 2a presents a side view depicting an "upper" and "lower" second portion (12) associated together by an attachment device (14). FIG. 2b is a top plan view showing an outer surface of the second portion (12), defining the entire top side of the exterior surface (13) ("top" as oriented in the figure). Similarly, FIG. 2d shows a backside view showing an outer surface of the second portion (12), defining the entire back side of the exterior surface (13). Thus, for the currently preferred embodiment, at least part of the outer surface of the second portion (12) defines substantially all of the exterior surface (13) of the convertible cushion (10). It will be appreciated by one of ordinary skill in the art that the first portion (11) and the second portion (12) may be of different sizes, including outer perimeters.

As will be described later, alternative embodiments include convertible cushion (10) embodiments with no second portion and second portions that are different in size compared to the first portion. For such an alternative embodiment, a section of the surface of the first portion (11) defines the exterior surface (13). Similarly, embodiments where a convertible cushion (10) comprises a plurality of portions where any portion may define at least part of the exterior surface (13), depending on the way the convertible cushion is folded, fall within the scope of the invention.

When a convertible cushion (10) is configured with a second portion (12), such a second portion is preferably configured to define at least part of the exterior surface (13) in the zipped configuration (as shown in FIG. 2a-2d). Its outer surface is preferably constructed from a first soft material, pleasing to the touch, such as high-quality upholstery fabrics, cotton, polyester, suede silk, suede cotton and or similar suede fabrics such as microfiber plush fabrics resembling the soft suede, but more durable, resistant to liquid, stains and crushing.

Figure 3:
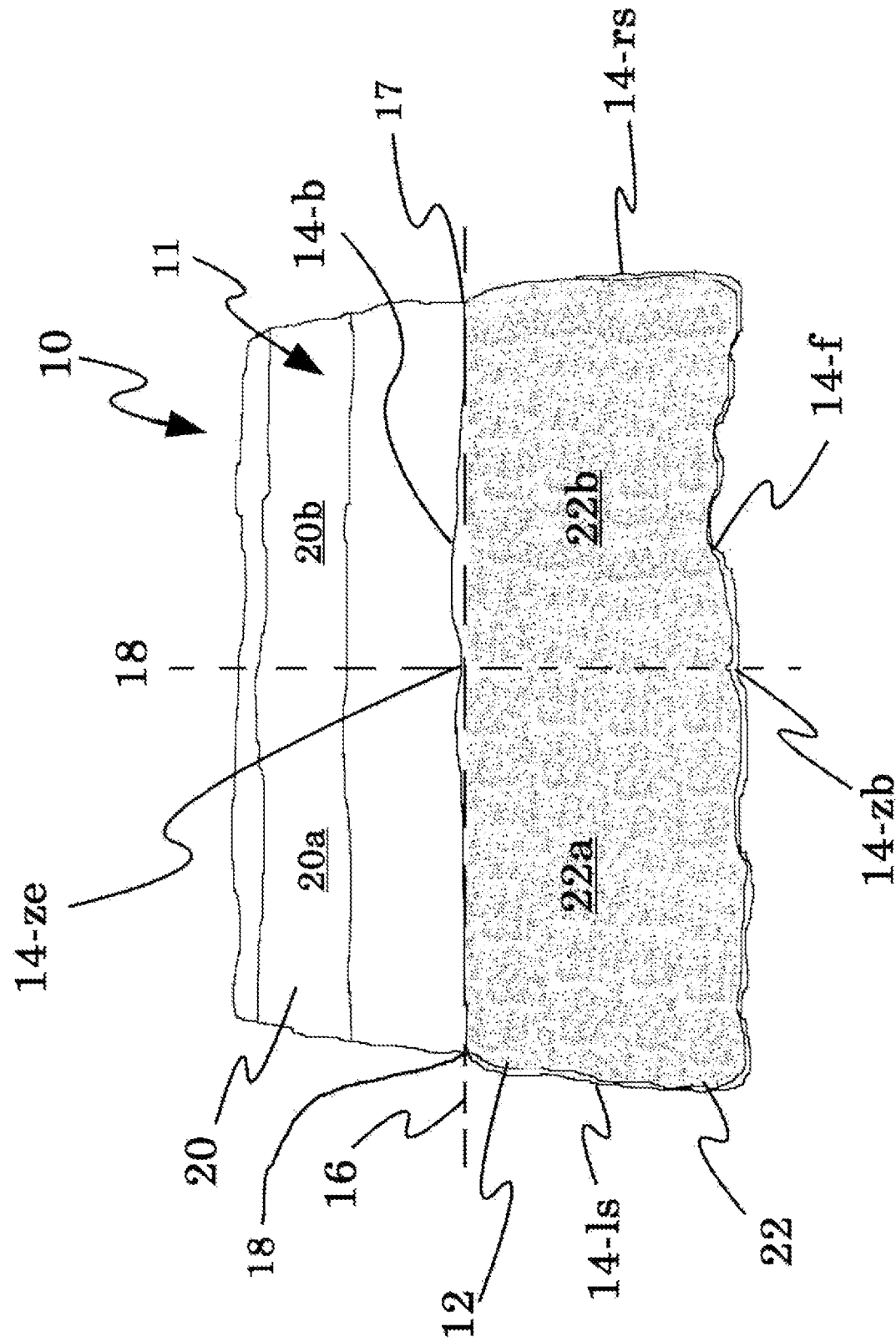
FIG. 3 is a front elevated perspective view of the first side of the unfolded convertible cushion of FIG. 1 showing a second soft portion disposed on, and associated with, part of a first canvas portion.
Figure 4:
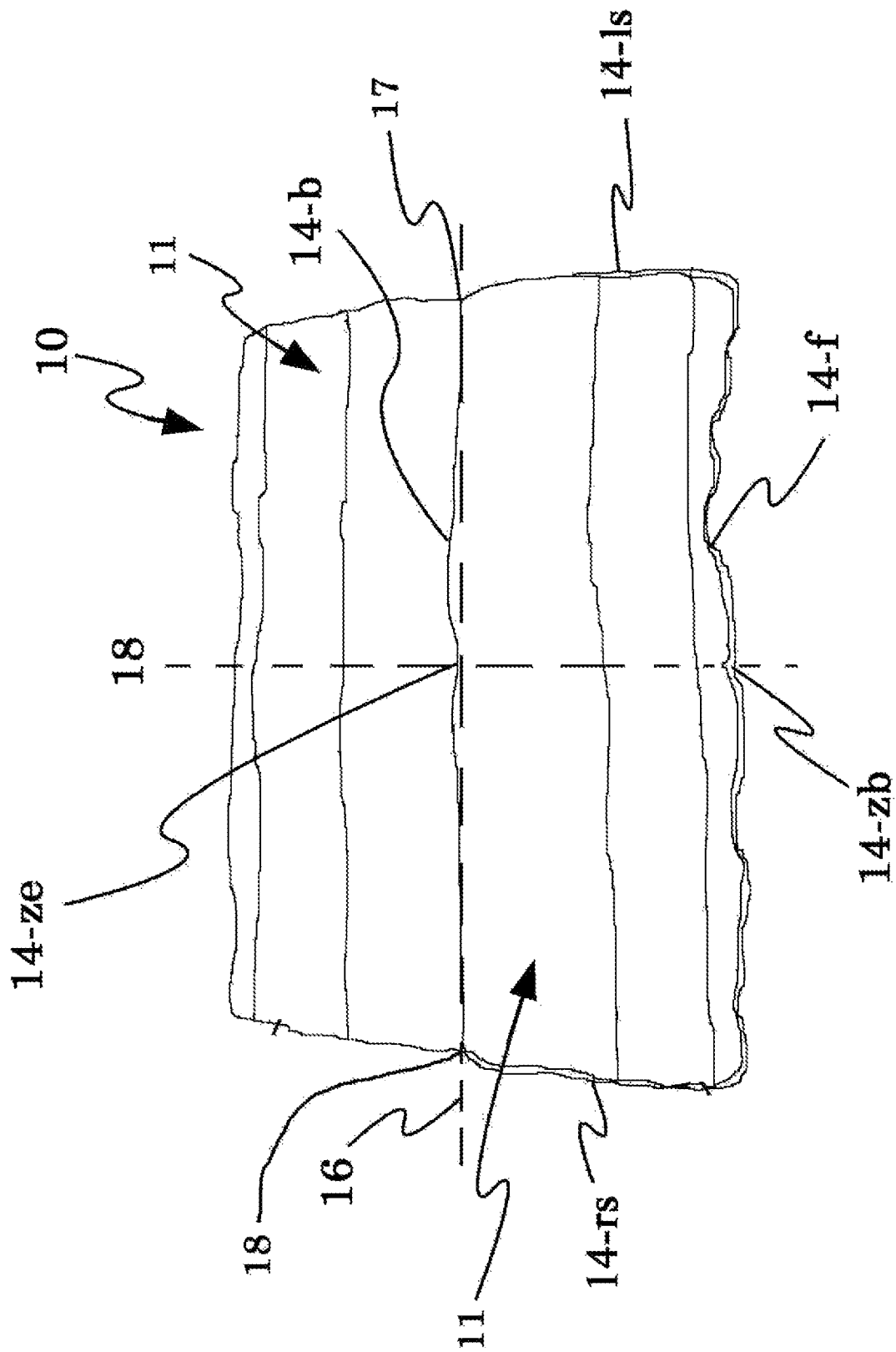
FIG. 4 is a front elevated perspective view of a second side of the unfolded convertible cushion of FIG. 1 showing the first portion making up the entire back side of the convertible cushion.
Figure 5:
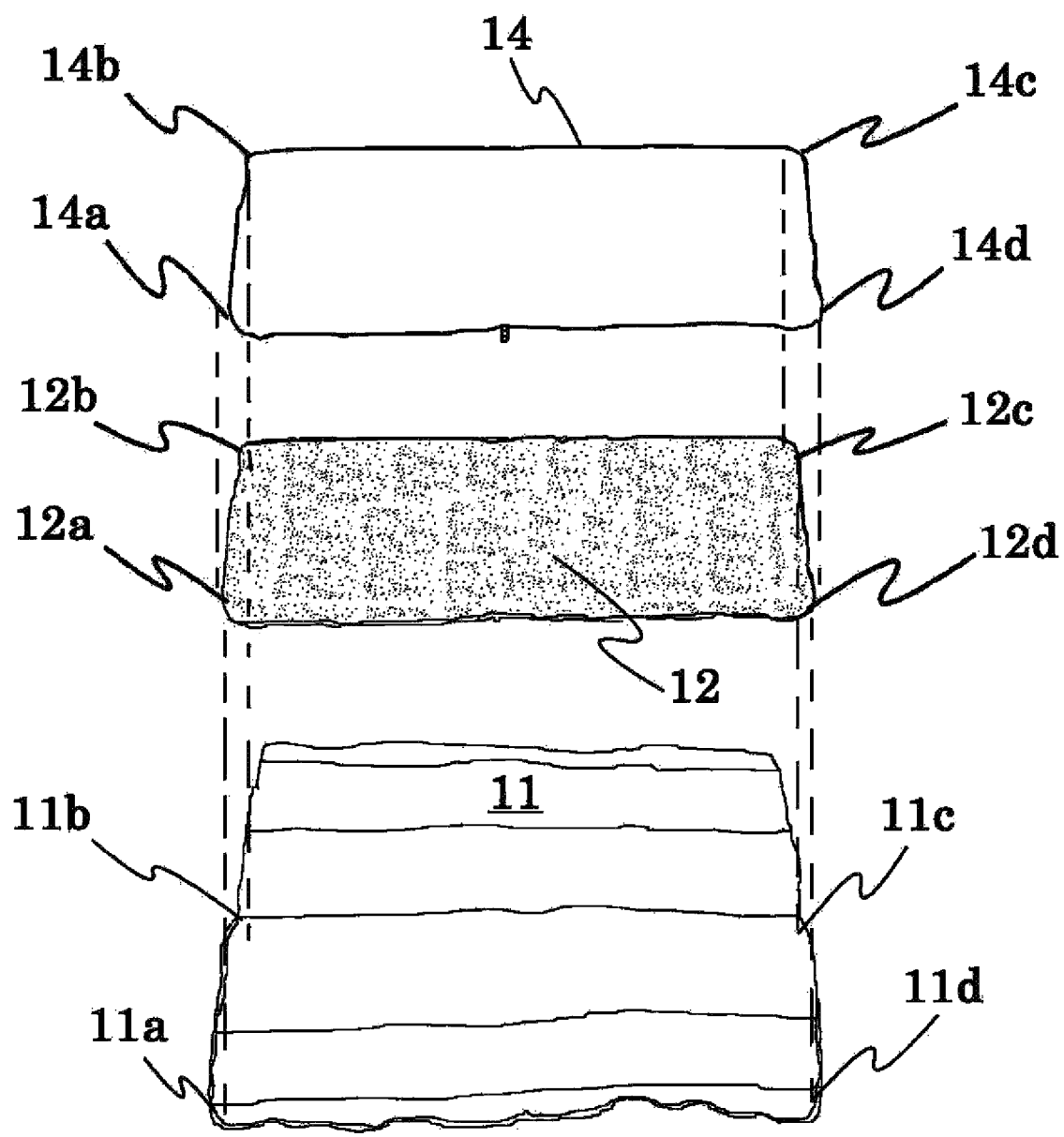
FIG. 5 is an exploded view of the convertible cushion of FIG. 3.

For embodiments comprising a second portion (12), FIG. 3 presents an elevated perspective view of the multiple layer side of the convertible cushion (10) in an unfolded configuration showing one edge of the first portion (11) associated with one edge of the second portion (12). This side is called the "multilayer" side as such side comprises both the first portion (11) layer and the second portion (12) layer. FIG. 4 presents an elevated perspective view of the back, single layer side, of the convertible cushion (10), showing only the exterior surface of the first portion (11). FIG. 5 presents an exploded view of FIG. 3.

For the currently preferred embodiment, the first portion (11) defines an outer shell with lightweight padding material disposed inside. For such configuration, the surface of the first portion (11) defines at least one protective layer and is preferably made from a durable material such as canvas and GORE-TEX®s that is washable while providing a fortified fluid-resistant shell configured to deliver a reliable, lightweight, seam sealed breathable layer.

Figure 3B:
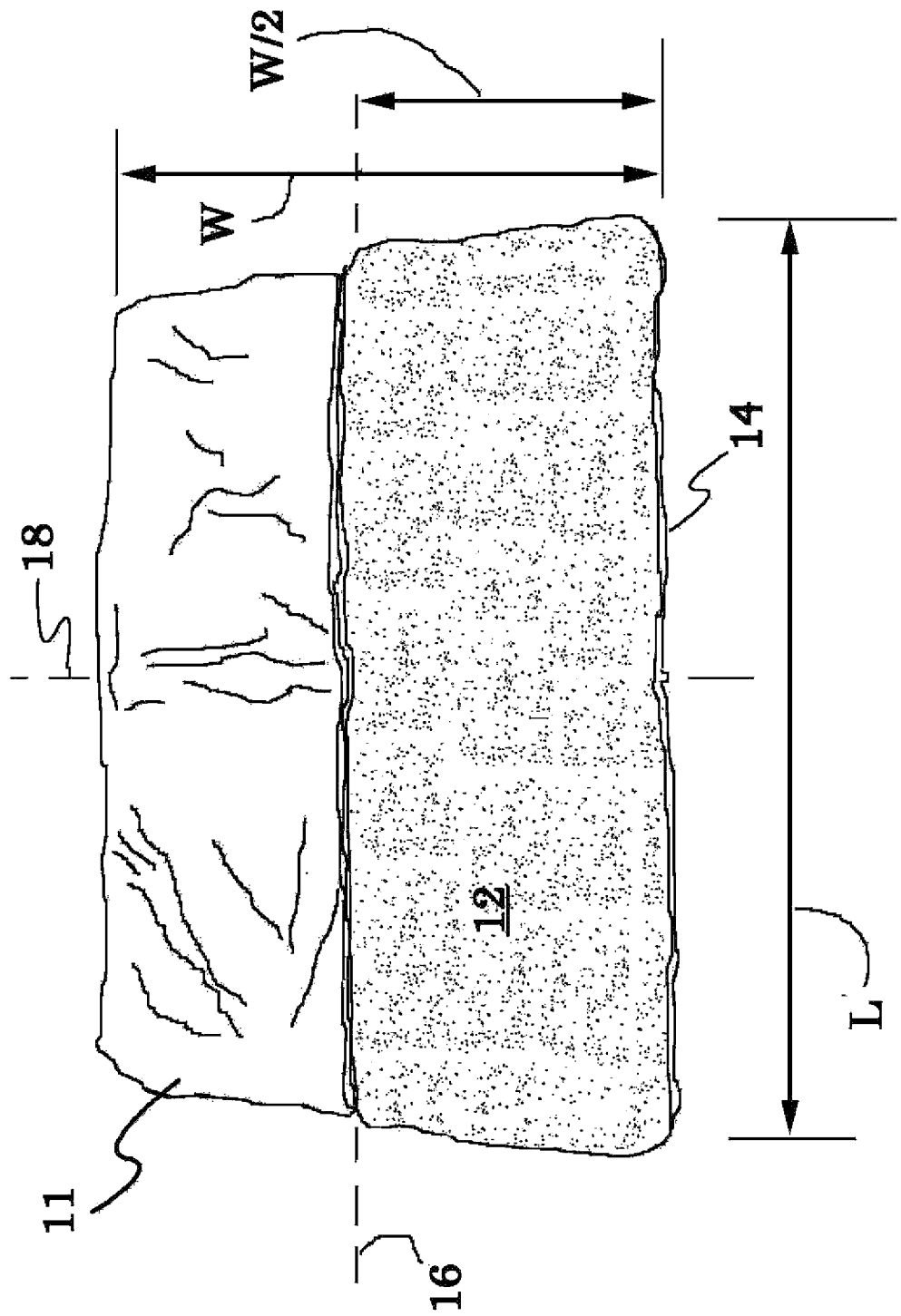
FIG. 3b is the view of FIG. 3 with dimension markers.

As best seen in FIG. 3b and FIG. 5, while the first portion (11) may be configured so that the perimeter of the first portion (11) defines any geometric figure, the perimeter of the first portion (11) defines a rectangle having a length equal to L and a width equal to W. As shown in FIG. 3, a second portion (12) is disposed on the surface of and associated with half of the first portion (11). Consequently, the second portion (12) has a length equal to L and a width equal to W/2. Thus, if the first portion is 30 inches long (i.e., L=30 inches) and 15 inches wide (i.e., W=15 inches), the second portion (12) is 30 inches long and 7.5 inches wide.

In an attempt to make describing the different sections of convertible cushion (10) easier to describe, FIG. 3 depicts imaginary line 16, which divides convertible cushion (10) into two equally sized sections, first section 20 and second section 22. Similarly, imaginary line 18 (FIG. 3) further divides such sections into first section 20a, first section 20b, second section 22a, and second section 22b. Thus, the area defined by the perimeter of the first portion (11) is equal to the area defined by the perimeter of first section 20 plus the area defined by the perimeter of second section 22 as the first portion (11) runs the entire length and width of convertible cushion (11). The area defined by the perimeter of the second portion (12) is simply the area defined by the perimeter of the second section 22.

As depicted in FIG. 5, the second portion (12) is associated with, and disposed adjacent to, the first portion (11) so that corners (11a-11d) are adjacent to corners (12a-12d), respectively. Similarly, the attachment device (14) is mechanically associated with the perimeter of the second portion (12) so that corners (14a-14d) are adjacent to corners (12a-12d), respectively. As noted above, for the currently preferred embodiment, the attachment device (14) is a zipper. As best seen in FIG. 3 and FIG. 4, the attachment point (14-ze) marks the ending point of the zipper (i.e., where the zipper stops when the convertible cushion (10) is folded and fully zipped). Notably, attachment Point (14-ze) further marks the center of the convertible cushion (10) when in the unfolded configuration. Similarly, the attachment point (14-zb) marks the beginning point of the zipper (14). Thus, starting at the attachment point (14-zb), zipper (14) runs along the perimeter edge (14-f) of the portion (22b) and continues along the perimeter edge section (14-rs) of portion 22b and to attachment point 14-ze. Similarly, starting at the attachment point (14-zb), zipper (14) runs in the opposite direction as before along the perimeter edge (14-f) of the portion 22a and continues along the perimeter edge section 14-ls of the portion 22a and back to the attachment point (14-ze).

Such attachment device (14) may further define a fluid replant flap such as a Velcro® storm flap that help keeps fluid from reaching the inter folds via zipper 14. Additionally, the attachment device (14) may define a two-way zipper (can be zipped closed or zipped open in either direction.

As will be described below, for the above convertible cushion (10) configuration, the convertible cushion is folded twice and zipped to form a cushion.

For one alternative embodiment, the attachment device (14) simply runs along the perimeter of the unfolded convertible cushion (10) (i.e., the perimeter of the first portion (11)). For such a configuration, the convertible cushion (10) is only folded once and zipped.

Folding

As shown in FIG. 3, a convertible cushion (10) defines a blanket when unfolded. The method of folding the convertible cushion (10) to/from a bed/cushion is now presented.

First, the convertible cushion (10) is folded along the imagery line (16, FIG. 3) so that the first portion (11) makes up one side of the outer surface and the second portion (22) makes up the opposing side of the outer surface. Second, the folded convertible cushion (10) is folded again, this time along the imagery line 18 (FIG. 3), so that the second portion (12) makes up the outer surface of both sides and the first portion (11) makes up the inner folds (see FIG. 2c). Third, attachment device (14) is used to secure the opposing sides of the second portion (12) together thereby securing the first portion (11) inside defining inner folds. Stated differently, for the current embodiment, the attachment device (14) is a zipper; thus, the zipper (14) is zipped along three sides of a properly folded convertible cushion, thereby enclosing the first portion (11) inside (inter folds) convertible cushion (10) as depicted in FIG. 2a-2d.

Plurality of Attachment Devices

As noted above, the perimeter of the second portion (12) is associated with an attachment device (14) so that when the convertible cushion (10) is in the fully zipped configuration, the outer surface of the second portion (12) defines the outer surface of convertible cushion (10). For one alternative embodiment, the attachment device (14) is associated with the perimeter of the first portion (11) that defines the first section (20, FIG. 3). As noted above and as depicted in FIG. 3, the first section (20) is adjacent to a second portion (12) (and the second section (22)). For such a configuration, the convertible cushion (10) may be folded and secured by an attachment device (14) so that the outer surface of the convertible cushion (10) is defined by at least part of the first portion (11). Here, the second portion (12) defines the inner folds (soft inner folds).

Additionally, one alternative embodiment may include both attachment device configurations so that the convertible cushion (10) may be folded in two different ways. The first way would cause at least part of the outer soft surface of the second portion (12) to define the outer surface convertible cushion (10). The second way would cause at least part of the outer canvas-like surface of the first portion (11) to define the outer surface of the convertible cushion (10), with the interior folds being defined by the soft second portion (12).

Extensions

For yet another alternative embodiment, at least part of an extension-attachment-device (14) may be associated with a perimeter edge of either the first portion (11) or the second portion (12). Suitable embodiments of an extension-attachment device (14) are the same as for an attachment device (14). For such configuration, the extension-attachment-device (14) is configured to be associated with the extension-attachment-device (14) of a similarly configured second convertible cushion (10), thereby doubling the size of the combined convertible cushion. For one such configuration, the length, L, (FIG. 3b) is about 6.5 feet, so two convertible cushions may be associated together using their respective extension attachment devices (14) to form a sleeping bag.

Similarly, by associating a second extension-attachment-device (14) to the opposing perimeter of the convertible cushion (10) (i.e., opposing sides are associated with an extension-attachment-device), a plurality of convertible cushions (10) may be associated together to make a blanket or sleeping bag of any width.

Carrying Bag/Backpack Convertible Cushion

Figure 6:
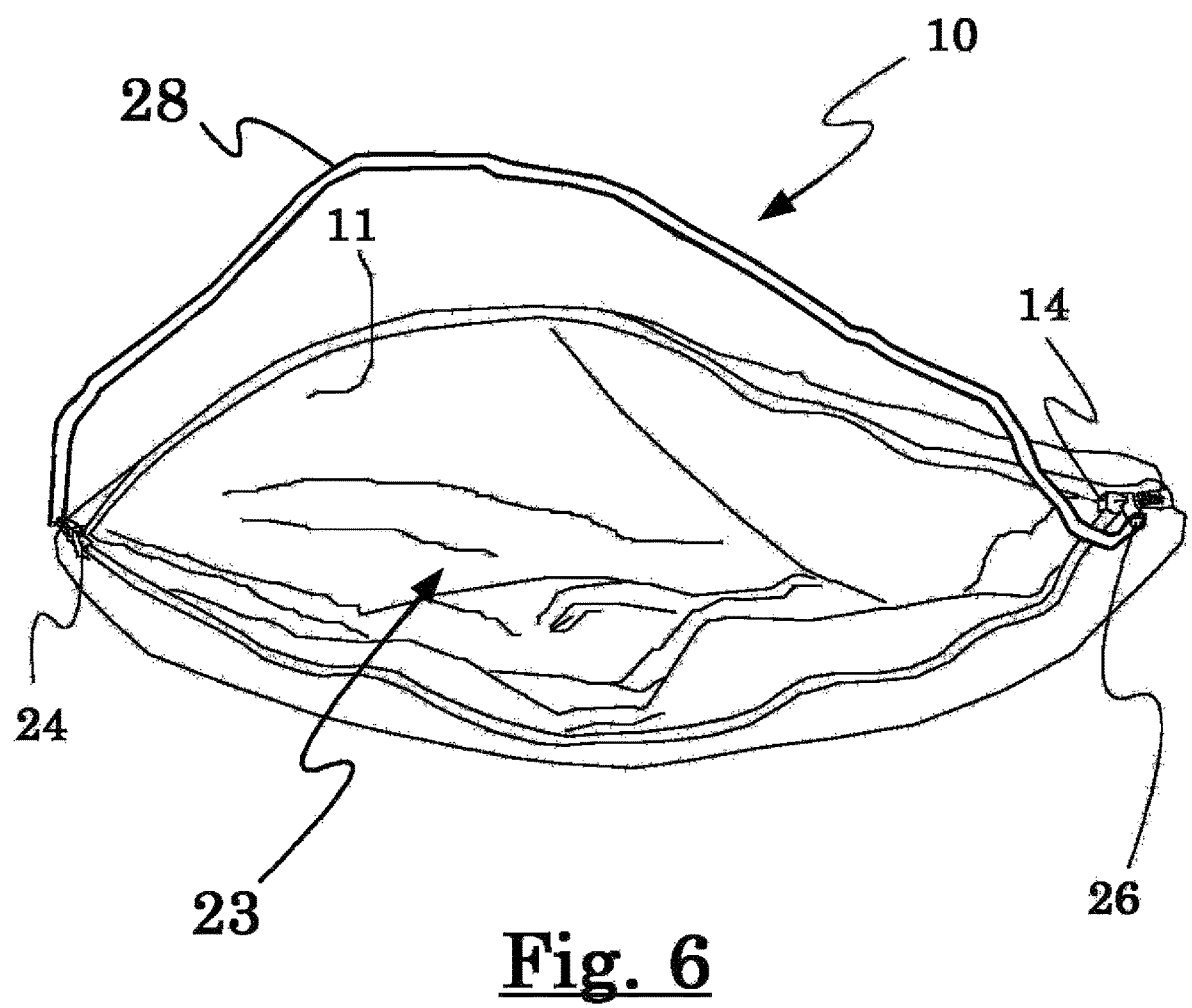
FIG. 6 is a side perspective view of a partially zipped convertible cushion comprising strap connections associated with a shoulder strap.
Figure 7:
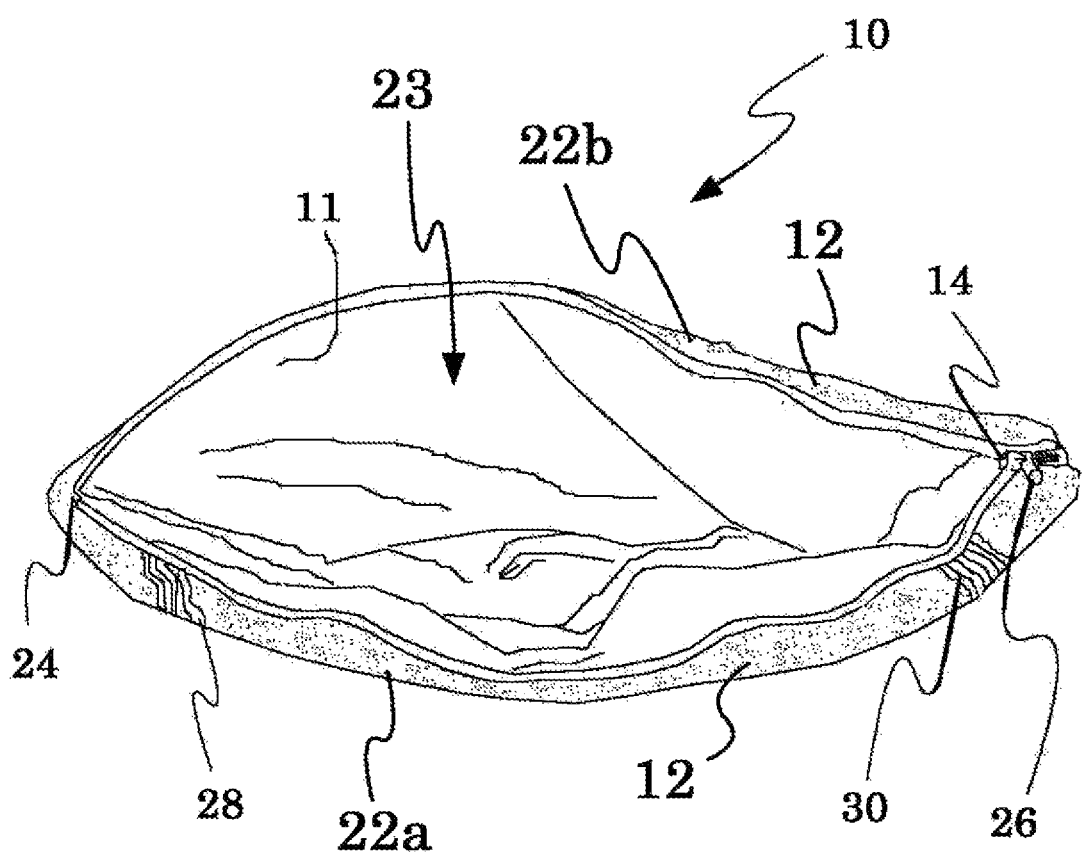
FIG. 7 is a side perspective view of a partially zipped convertible cushion comprising backpack shoulder straps.

Referring now to FIG. 6 and FIG. 7, two additional alternative views are presented. For FIG. 6, two strap connectors are added to the convertible cushion (10). Strap connectors 24 and 26 are configured for being mechanically associated with a strap, such as a shoulder strap, suitable for carrying a convertible Cushion (10) as one might carry a pocketbook. As depicted in FIG. 6, when the attachment device is only zipped along two sides of the convertible cushion (10), a void (23) is defined by the folded and partially zipped device. As depicted in FIG. 6, attachment device (14) further defines strap connector 26. Similarly, strap connector 24 is associated with the outer surface of the convertible cushion (10) at the attachment endpoint (14-ze) so that when the attachment device (14) is partially zipped around two sides, as depicted in FIG. 6, strap connector 24 and strap connector 26 are positions at opposing ends of the convertible cushion (10). By associating strap 28 to such strap connectors, the convertible cushion (10) may be used as a typical pocketbook or carrying bag. For example, when a convertible cushion (10) is used as a pet bed for a puppy, the puppy may be placed in void 23 and carried using the convertible cushion (10) while walking. When the pet is ready to use convertible cushion (10) as a bed, strap (28) is stowed inside void 23, and the attachment device (14) is fully engaged, forming a completely secured pet bed as depicted in FIG. 1.

Figure 8:
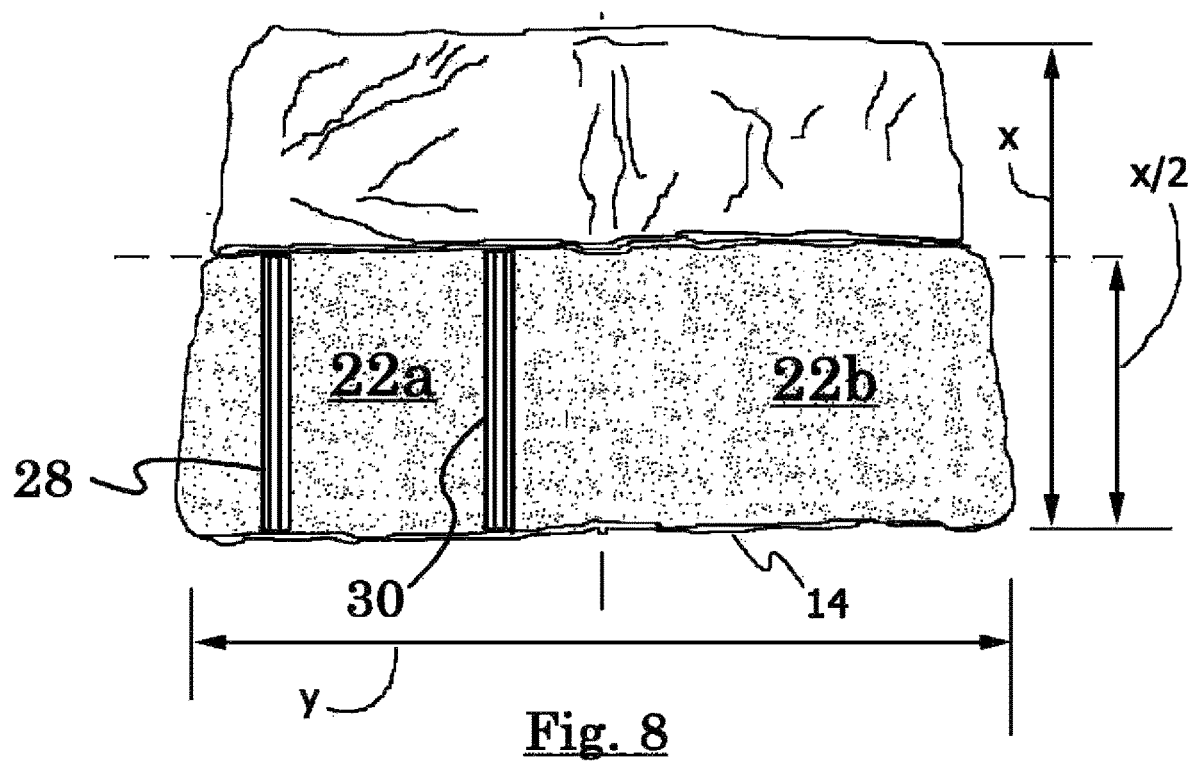
FIG. 8 is a front elevational view of the first side of the unfolded convertible cushion of FIG. 7.

Referring now to FIG. 7 and FIG. 8, another alternative embodiment of the device is presented comprising "backpack" type shoulder straps. For such a configuration, items may be stored in void 13, and convertible cushion (10) carried like a backpack using strap 28 and strap 30. As best viewed in FIG. 8, the ends of strap 28 and strap 30 are associated with the perimeter of the second portion (12) so as to span across section (22a) and section (22b), respectively. When the convertible cushion (10) is folded and zipped as described above, the configuration shown in FIG. 7 is achieved.

Collapsible Chair Support

Figure 9:
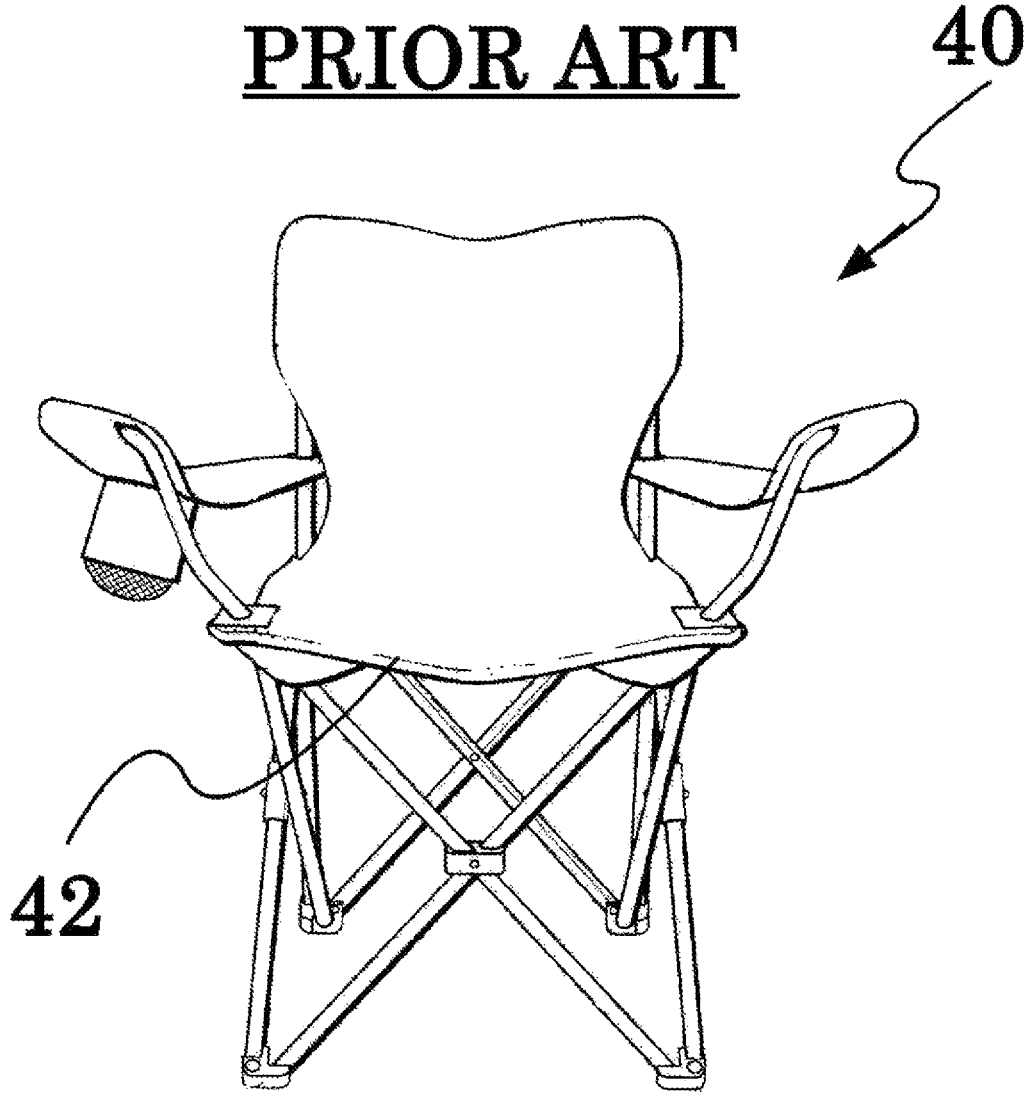
FIG. 9 is a front view of a prior art collapsible chair.
Figure 10:
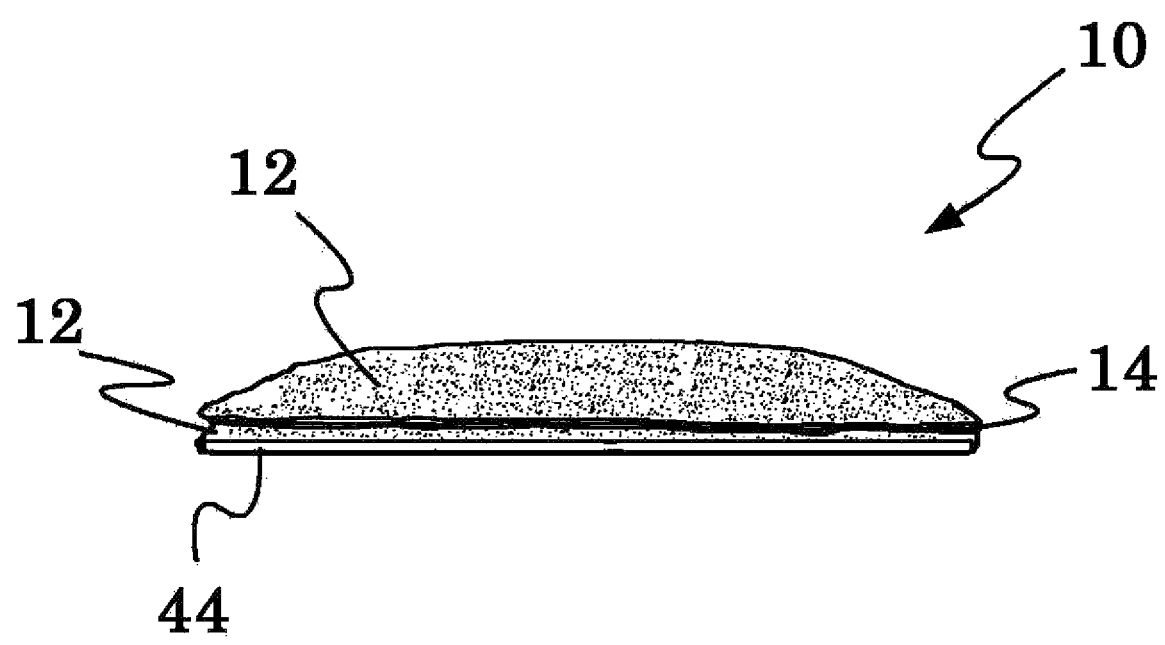
FIG. 10 is a side view of a convertible cushion configured with a support board.
Figure 11:
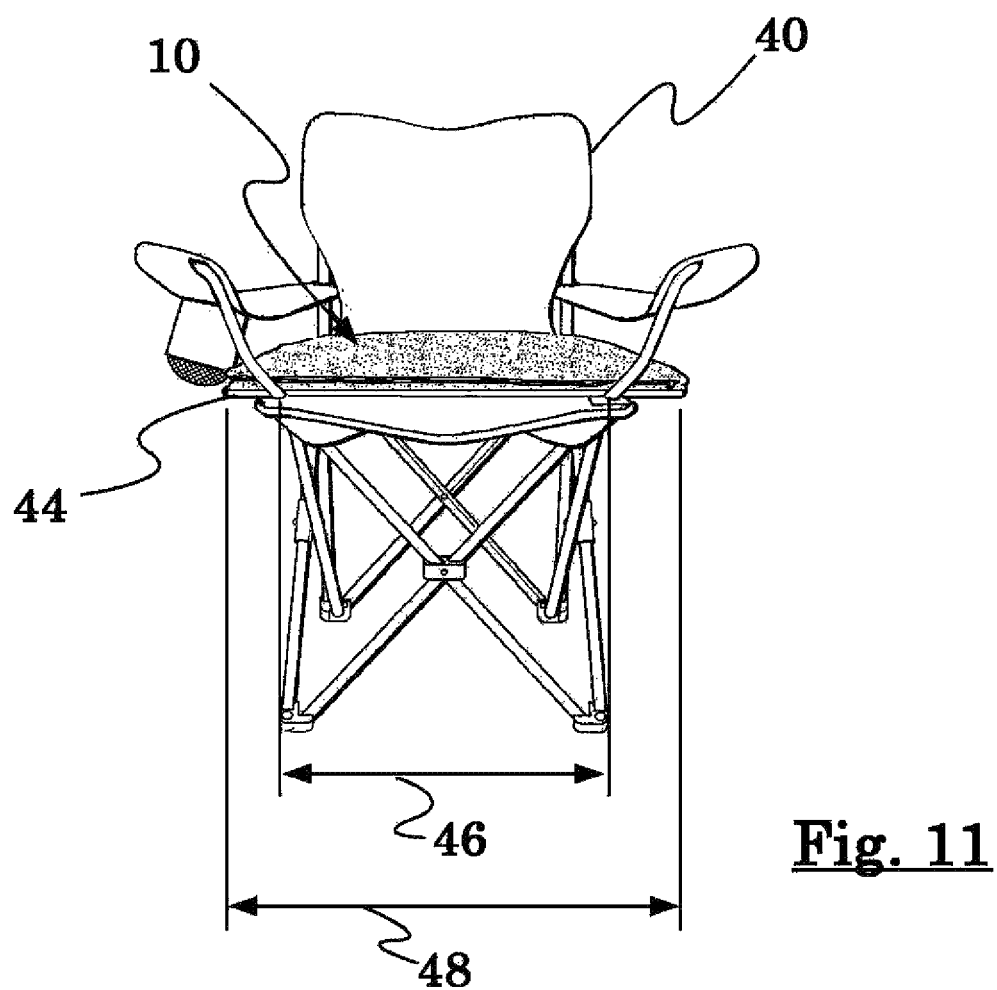
FIG. 11 is a front view of a convertible cushion configured with a support board associated with the collapsible chair of FIG. 9.
Figure 12:
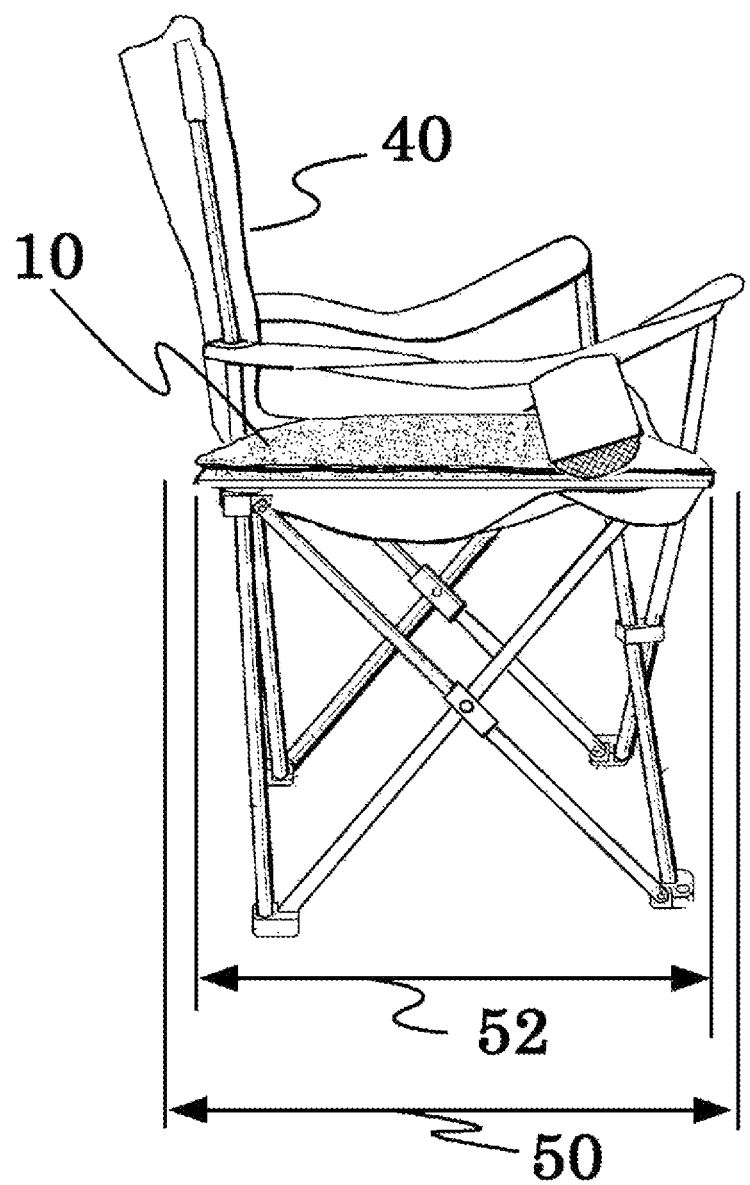
FIG. 12 is a side view of a convertible cushion configured with a support board associated with the collapsible chair of FIG. 9.

Referring now to FIG. 9, FIG. 10, FIG. 11, and FIG. 12, an alternative embodiment of the convertible cushion (10) is presented. FIG. 9 shows a typical prior art collapsible chair typically used by people viewing outdoor events. One problem with such chairs relates to their "deep" sitting position. Such chairs typically have a sitting position that is too deep, causing the back of the user's legs to press against the cross-section (42), which over time, becomes uncomfortable. Yet another problem is that getting out of such a seating position, especially for older users, can be difficult. To address such issues, the convertible cushion (10) is configured with a support board of a predefined size. FIG. 10 is a side view of a convertible cushion (10) configured with an external pocket configured for receiving a support board (44). As best seen in FIG. 11, the convertible cushion (10) is configured with a support board (44) that defines a length-1 (48) that is long enough to span across the length (46) of prior art collapsible chair (40). Similarly, as best seen in FIG. 12, the length-2 (52) of the support board (44) is just less than the length (50) of the collapsible chair (40), thereby allowing such a convertible cushion to be associated with collapsible chairs as shown in the above cite figures.

For most prior art collapsible chairs (40), the length (46) is about 21 inches, and the length (50) is about 16 inches. Consequently, for the presently preferred embodiment, convertible cushion (10) is configured with a pocket-sized to receive a support board (44) that has a support board length-1 (46) of greater than about 21 inches and a support board length-2 (52) of less than about 16 inches. For the preferred embodiment, the support board length-3 (52) is about 15 inches, and the support board length-1 (46) is about 21 inches.

Notably, such a convertible cushion (10) may also be used as a cushion that rests on typical cement bleachers in stadiums where sporting events are held. For such situations, the cement bleachers supply a support surface that may be wet, sticky, and dirty/muddy. The support board (44) supplies a gap between the convertible cushion's bottom surface and the support surface.

Additionally, one of ordinary skill in the art will appreciate that the support board (44) supplies a flat sitting surface in areas where the support surface is not level.

Convertible Cushion with Blanket Feature

Figure 13:
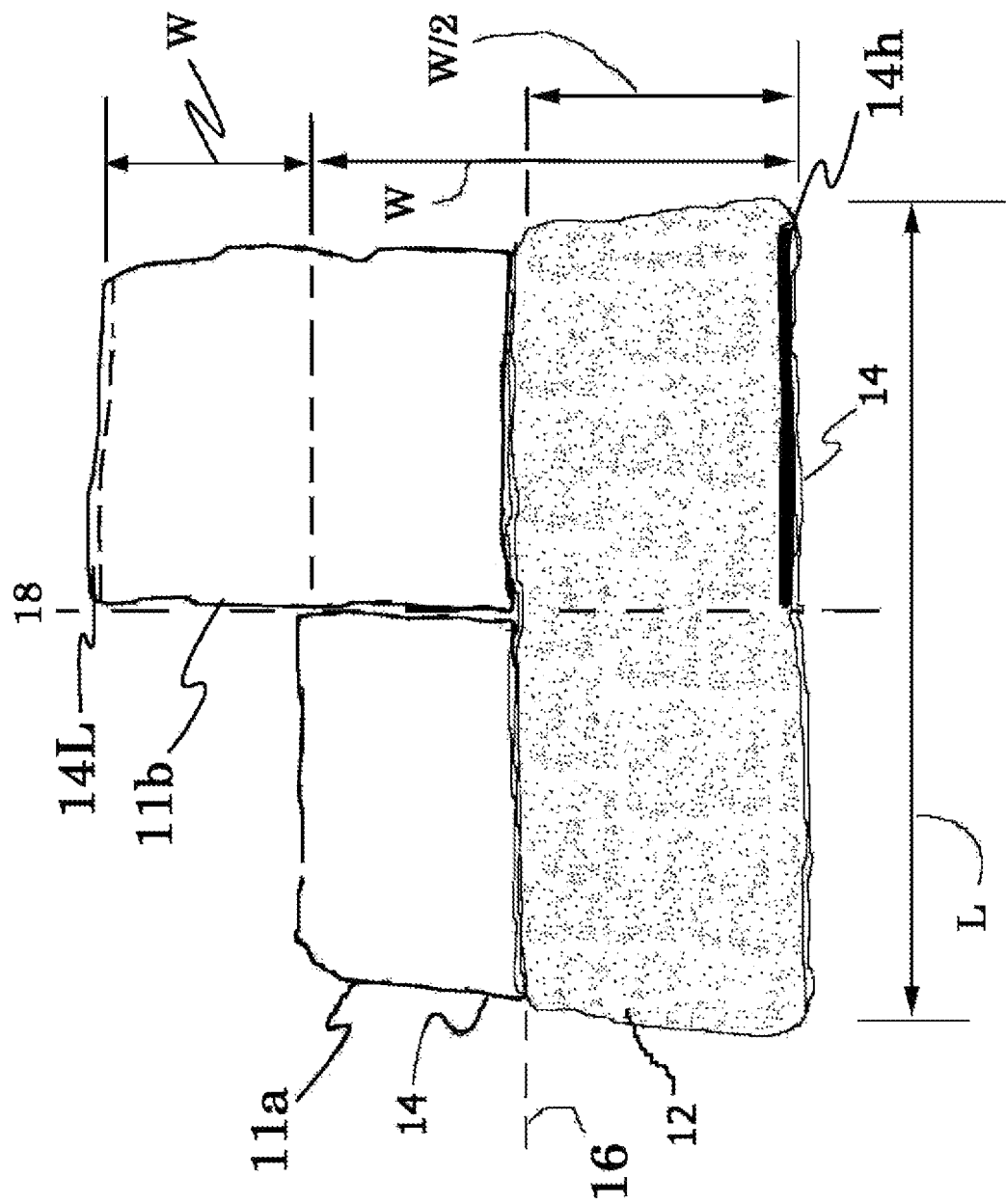
FIG. 13 is a front view of an unfolded convertible cushion wherein the first portion is divided into two sections, with one section providing a blanket function.

Referring now to FIG. 13, another exemplary embodiment of the invention is presented where the convertible cushion (10) provides a blanket feature while configured as a cushion. For such embodiment, the first portion (11) is divided into two sections, the first portion section (11a) and the first portion section (11b). As depicted in FIG. 13, such division is preferably made along the iminagery line 18, and the first portion section (11b) preferably has a width of 2W while the first portion section (11a) has a width of W. For such an embodiment, when the convertible cushion (10) is folded and only zipped part way, as depicted in FIG. 6, the fold defined by the first portion section (11b) may be pulled out of void 13 and used as a blanket by a pet, for example, that is lying on the convertible cushion (10) as depicted in FIG. 1. Notably, for one alternative embodiment, the first portion (11) may be configured as in FIG. 3 and portion section (11b) may be a separate blanket section that is mechanically associated with the perimeter of the first portion (11) to achieve the configuration depicted in FIG. 13.

Additionally, a perimeter edge of portion 11b and the second portion (12) may be associated with an attachment device such as a hook and loop device. As depicted in FIG. 13, at least a portion of the surface of portion section (11b) at the perimeter of portion section (11b) is associated with attachment device 14L (loops). Similarly, at least a portion of the surface of the opposite side of the second portion (12), at the perimeter of the second portion (12), is associated with attachment device 14h (hooks). For such a configuration, the blanket portion (portion section (11b) may be mechanically associated with the second portion (12) when the convertible cushion (10) is partially folded, and the blanket portion pulled out of the void (23). Such a configuration would form a flap to secure items in the void (23).

Pocket Version

Figure 14:
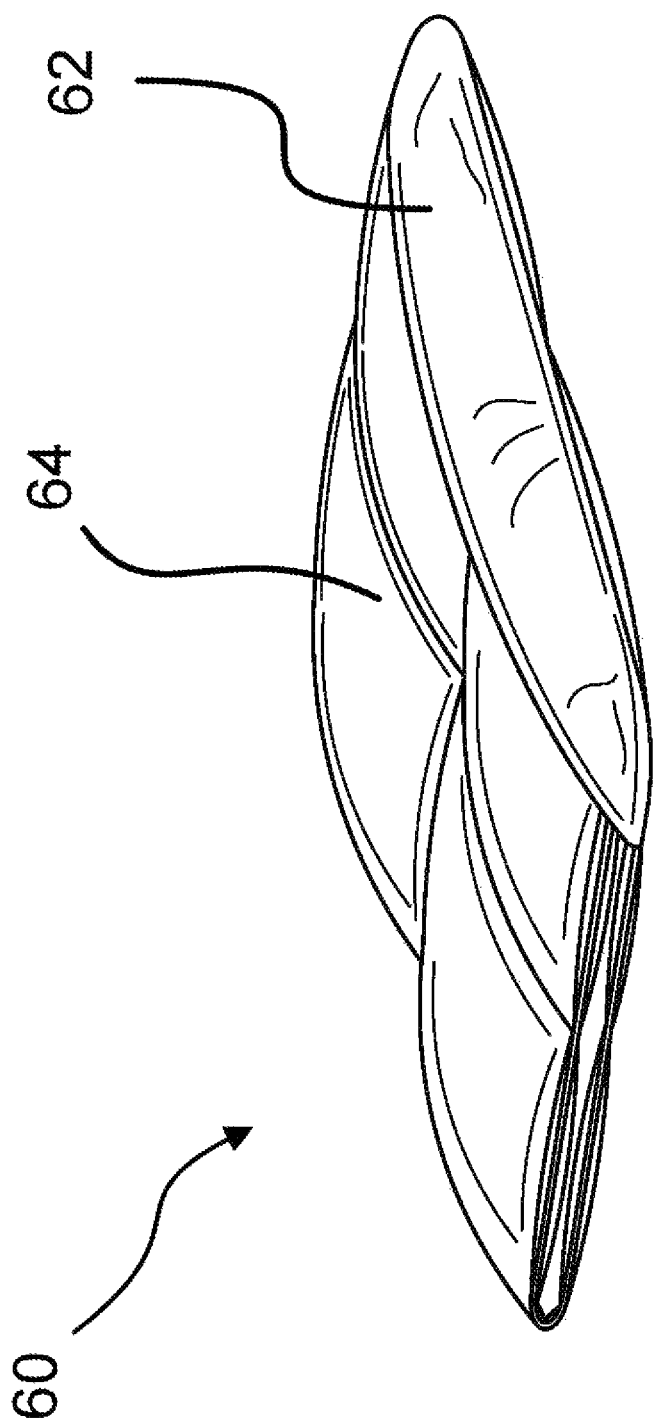
FIG. 14 is an elevated perspective view of the ornamental features of one alternative embodiment thereof where the bed is folded.
Figure 15:
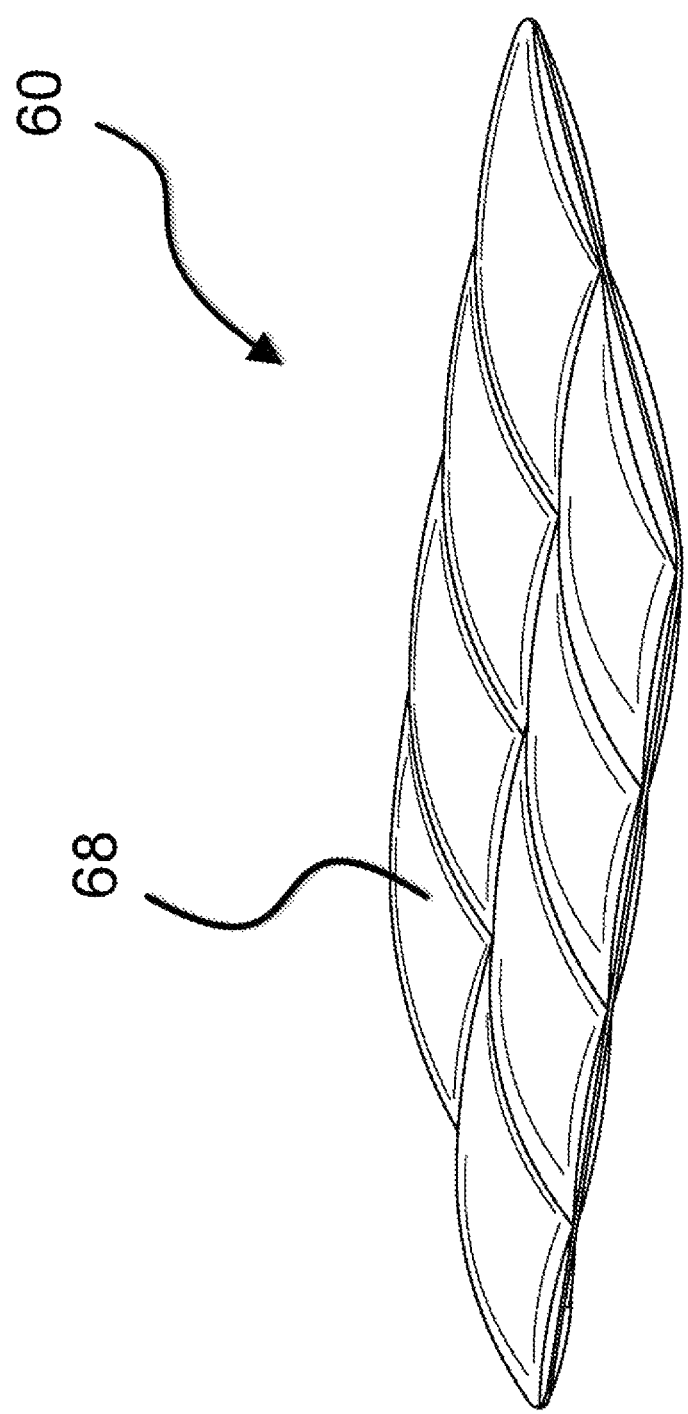
FIG. 15 is an elevated perspective view of the first surface of an unfolded bed thereof.
Figure 16:
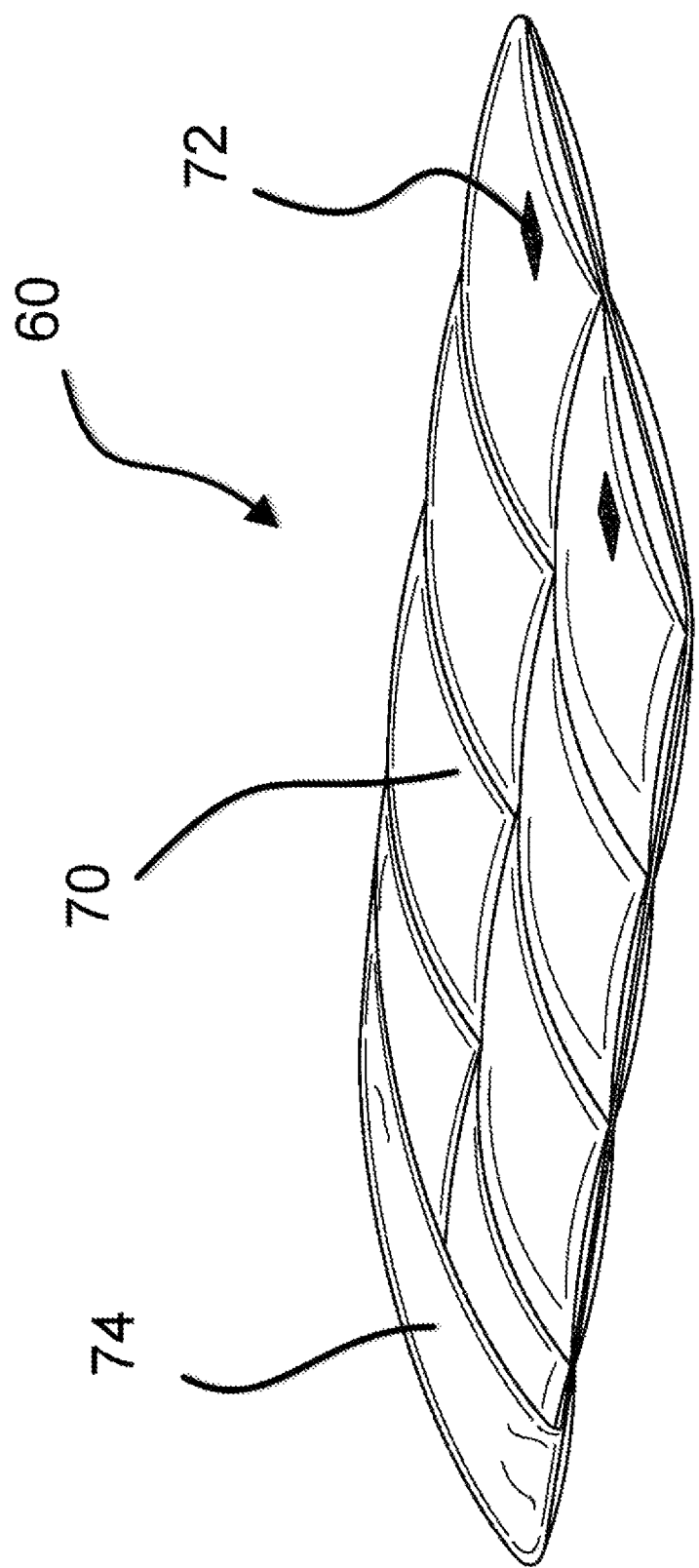
FIG. 16 is an elevated perspective view of a second opposing surface showing a pocket at the first end and first attachment elements at the opposing second end thereof.
Figure 17:
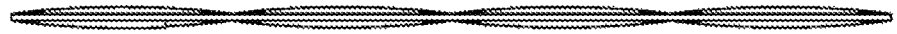
FIG. 17 is a first side elevation view thereof.
Figure 18:
FIG. 18 is a second side elevation view thereof.
Figure 19:
FIG. 19 is a first-end elevation view thereof.
Figure 20:
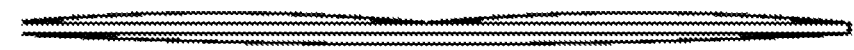
FIG. 20 is a second end elevation view thereof.
Figure 21:
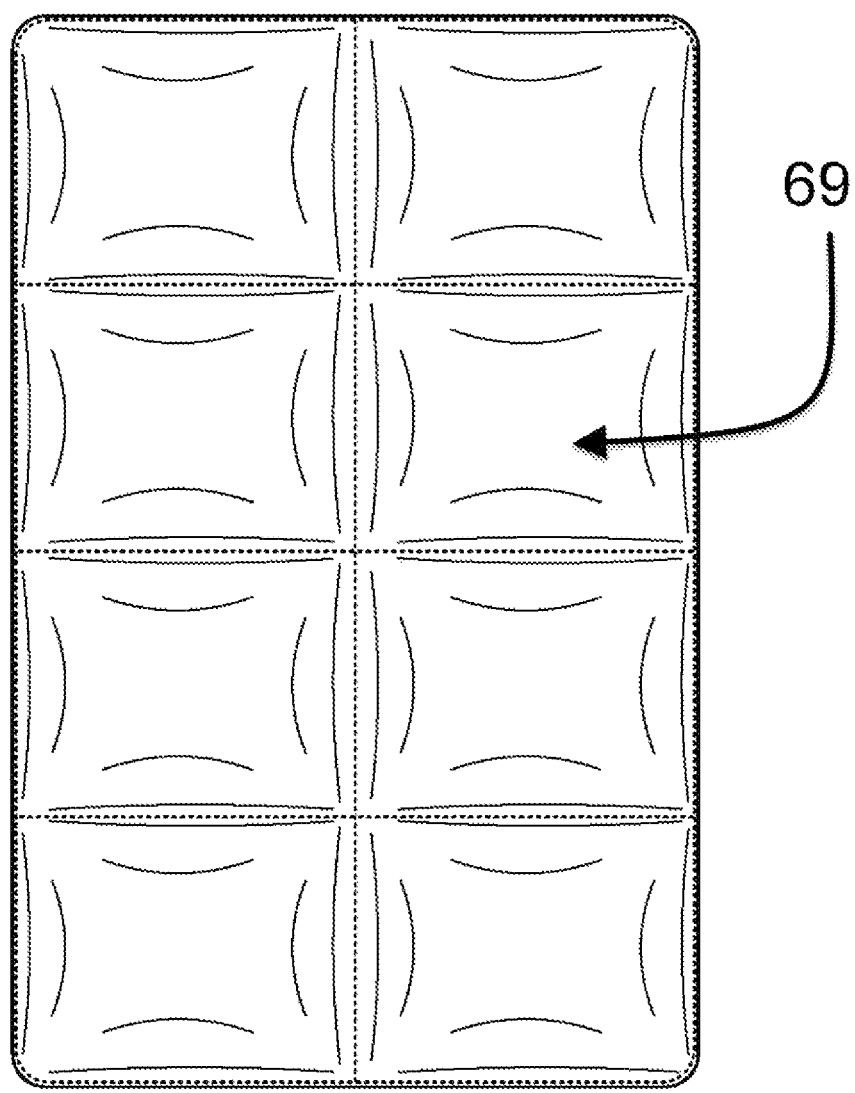
FIG. 21 is a plan view of the first surface thereof.
Figure 22:
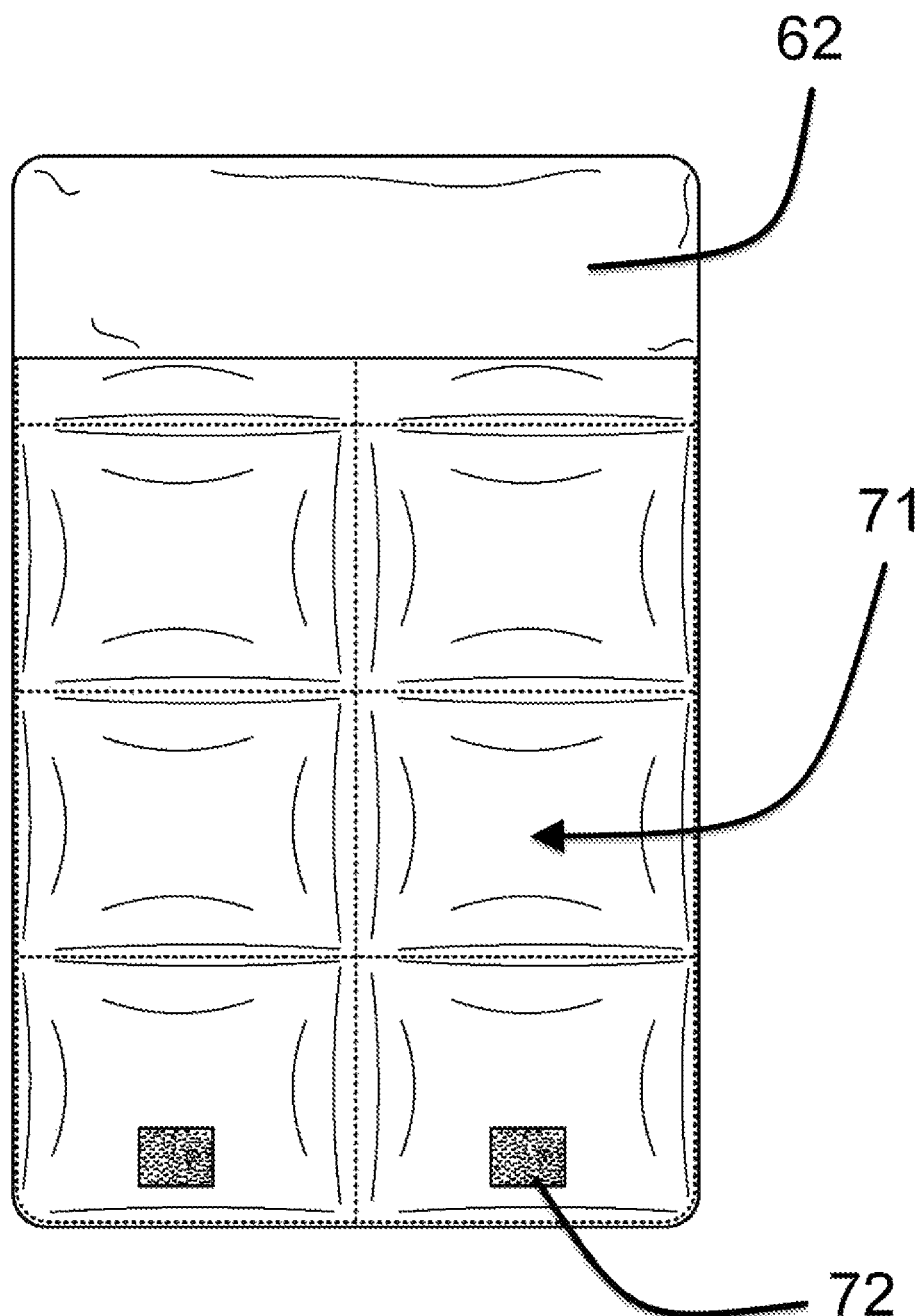
FIG. 22 is a plan view of the second surface thereof.
Figure 23:
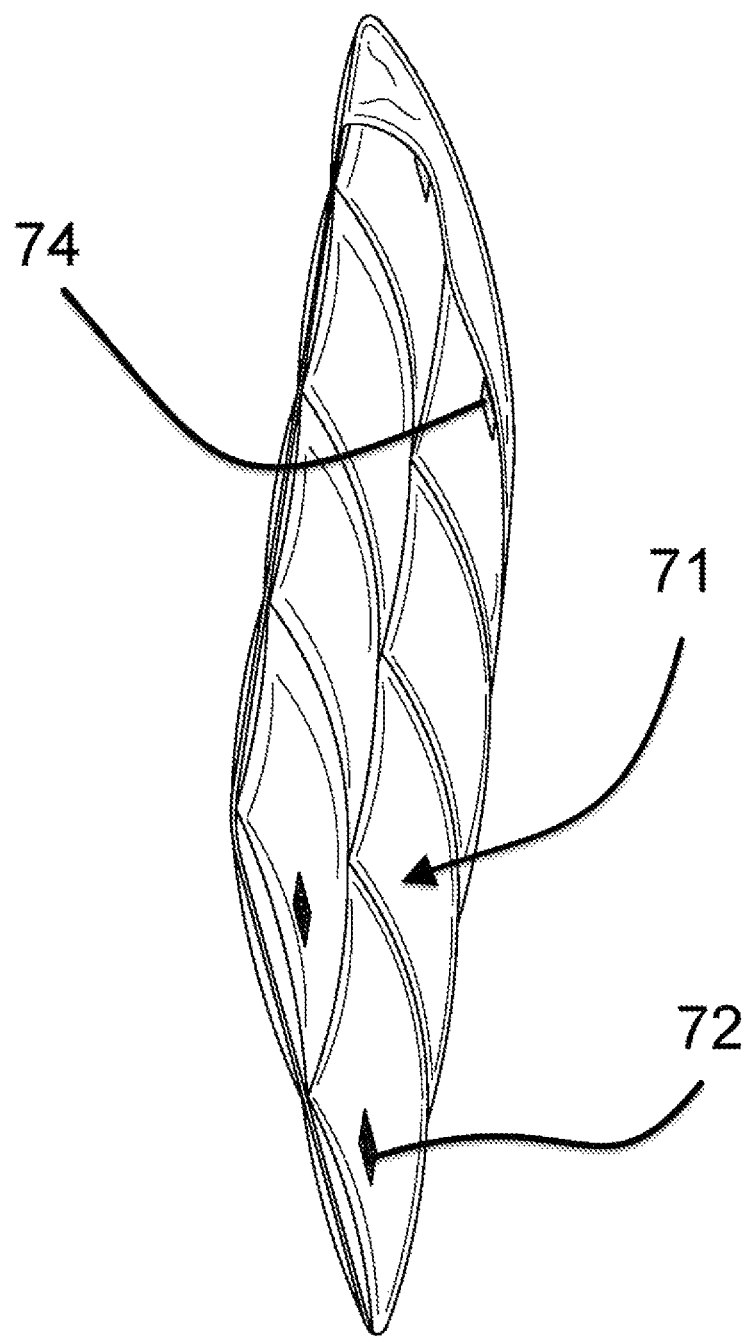
FIG. 23 is an elevated perspective view of the second surface of FIG. 16, where the pocket is more open, showing second attachment elements thereunder.

Referring now to FIG. 14 through 23, novel ornamental and utilitarian features of one alternative embodiment of the invention are presented. FIG. 14 is an elevated perspective view of the ornamental features of one alternative embodiment thereof where the bed is folded. FIG. 15 is an elevated perspective view of the first surface (69) of the unfolded bed in FIG. 14. FIG. 16 is an elevated perspective view of a second opposing surface showing a pocket at the first end and first attachment elements at the opposing second end. FIG. 17 is an elevational view of a first side elevation, while FIG. 18 is an elevational view of a second side. FIG. 19 is the first-end elevation, and FIG. 20 is an elevational view of the opposing second end. FIG. 21 is a plan view of the first surface, while FIG. 22 is a plan view of the opposing second surface thereof. FIG. 23 is an elevated perspective view of the second surface of FIG. 16, where the pocket is more open, showing the second attachment elements thereunder.

Referring now to FIG. 15 and FIG. 16, a convertible cushion is presented. The converter cushion (60) comprises a first foldable portion (68) defining a first surface (69) composed of a first material and having a perimeter that defines a first rectangle (although any shape may be used) and an opposing second foldable portion (70) defining a second surface (71) composed of a second material and having a perimeter that defines a second rectangle that is similar to the first rectangle. Notably, similar polygons have the same shape but can be different sizes. Any polygonal shape may be used and can be a function of ornamental considerations along with surface criteria.

The second foldable portion (70) is associated with, and disposed adjacent to, a surface of the first foldable portion (68) so that the second foldable portion (70) covers one side of the first foldable portion (68) and wherein the four corners of the first rectangle are in substantial alignment with the four corners of the second rectangle as depicted in FIG. 15 so one side of the first foldable portion defines a first surface (69) and one side of the second foldable portion defines an opposing second surface (70).

A first attachment device (72) is associated with one end of the second surface, and at least one second attachment device (74) is associated with the opposing end of the second surface, wherein the second attachment device is configured to be mechanically associated with said first attachment device. Notably, the attachment devices are positioned along their respective ends so that when the configurable cushion (60) is folded, and the attachment devices are mechanically associated together, the corners of the configurable cushion (60) are in alignment, as depicted in FIG. 14.

It will be appreciated that the attachment devices may be any suitable attachment devices such as Velcro®, snaps, zippers, etc., magnet, ferromagnetic and the selection thereof may be more a function of aesthetic considerations than utilitarian considerations.

For one embodiment, a pocket (62) is disposed at one end of the second surface and suitably sized to cover the associated attachment device (either the first attachment device or the second attachment device), as depicted in FIG. 14.

As described above, the surface of the first foldable portion (70) preferably defines a softer surface compared to the surface of said second foldable portion and defines a protective layer constructed from a durable material that is washable. For one embodiment, the multipurpose convertible cushion (60), the first foldable portion is configured with a second pocket suitably sized to receive a support board that is about 21 inches long and 15 inches wide.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude the inclusion of such modifications, variations, and/or additions to the present subject matter as would be readily apparent to one of ordinary skill in the art.

What is claimed is:

1. An apparatus comprising:
   a pet bed that converts between an unfolded blanket configuration and a folded cushion configuration using a zipper, wherein:
   in the unfolded blanket configuration, the pet bed includes a first side and a second side opposite the first side, the first side and second side together forming a rectangular unfolded outer perimeter of the pet bed, the rectangular unfolded outer perimeter being defined by two opposed lateral edges and two opposed longitudinal edges of the first side and second side;

the zipper is: (a) fully unzipped in the unfolded blanket configuration and (b) extends (i) across one of the lateral edges of the rectangular unfolded outer perimeter, (ii) halfway across each of the two opposed longitudinal edges, and (iii) across the first side between the two opposed lateral edges; the zipper thereby encompassing a first half of the first side, the first half forming an exterior surface of the pet bed in the folded cushion configuration;

the zipper has a beginning point where the zipper starts and an ending point where the zipper stops when fully zipped, the beginning point being on the lateral edge of the rectangular unfolded outer perimeter across which the zipper extends, the ending point being at a lateral and longitudinal center of the first side;

in the folded cushion configuration: (a) the first side and second side are folded in half laterally and longitudinally relative to the unfolded blanket configuration; (b) the zipper is fully zipped forming a folded outer perimeter defined by the zipper on three sides of the folded outer perimeter, the folded outer perimeter being one half of the rectangular unfolded outer perimeter; (c) the exterior surface forms an exterior of the pet bed in the folded cushion configuration; and (d) the second side and half of the first side are enclosed within the exterior surface by the zipper.

2. The apparatus of claim 1, wherein the first side and second side are fabric.

3. The apparatus of claim 1, wherein a padding material is between the first side and the second side.

4. A method comprising:

providing the apparatus of claim 1 to a pet;

unfolding the pet bed from the folded cushion configuration to the unfolded blanket configuration after the pet has laid thereon by unzipping the zipper from fully zipped to fully unzipped; and laundering the pet bed in a household washing machine.

5. The method of claim 4, wherein a padding material is between the first side and the second side.

* * * * *